(12) United States Patent
Dubey et al.

(10) Patent No.: US 9,835,809 B2
(45) Date of Patent: Dec. 5, 2017

(54) ALIGNMENT OF OPTICAL COMPONENTS USING NANOMAGNETS

(71) Applicant: Cisco Technology, Inc., San Jose, CA (US)

(72) Inventors: Neeraj Kumar Dubey, Northhampton, PA (US); Rao V. Yelamarty, Allentown, PA (US); Soham Pathak, Allentown, PA (US); Gnyaneshwar Ramakrishna, Fremont, CA (US); Kalpendu Shastri, Orefield, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/082,908

(22) Filed: Mar. 28, 2016

(65) Prior Publication Data

US 2017/0276885 A1    Sep. 28, 2017

(51) Int. Cl.
 *G02B 6/36* (2006.01)
 *G02B 6/38* (2006.01)
 *G02B 6/42* (2006.01)

(52) U.S. Cl.
 CPC ......... *G02B 6/3886* (2013.01); *G02B 6/3885* (2013.01); *G02B 6/421* (2013.01); *G02B 6/423* (2013.01); *G02B 6/425* (2013.01); *G02B 6/4257* (2013.01); *G02B 6/4292* (2013.01)

(58) Field of Classification Search
 CPC .... G02B 6/3886; G02B 6/3885; G02B 6/421; G02B 6/423; G02B 6/425; G02B 6/4257; G02B 6/4292
 USPC .......................................... 385/89
 See application file for complete search history.

(56) References Cited

U.S. PATENT DOCUMENTS

| 2012/0280344 | A1 | 11/2012 | Shastri et al. | |
| 2014/0205235 | A1* | 7/2014 | Benjamin | G02B 6/4292 385/33 |
| 2016/0216445 | A1* | 7/2016 | Thacker | G02B 6/12004 |

* cited by examiner

*Primary Examiner* — Jerry Blevins
(74) *Attorney, Agent, or Firm* — Patterson + Sheridan, LLP

(57) ABSTRACT

Embodiments herein include an optical system, an optical component, and an associated method of passive alignment in which complementary magnetic patterns are used to provide passive alignment between optical elements. The magnetic coupling between the magnetic patterns operates to align optical elements in at least two dimensions. The magnetic coupling provides a temporary holding force on the optical elements until the optical elements are secured using epoxy or other adhesive.

18 Claims, 7 Drawing Sheets

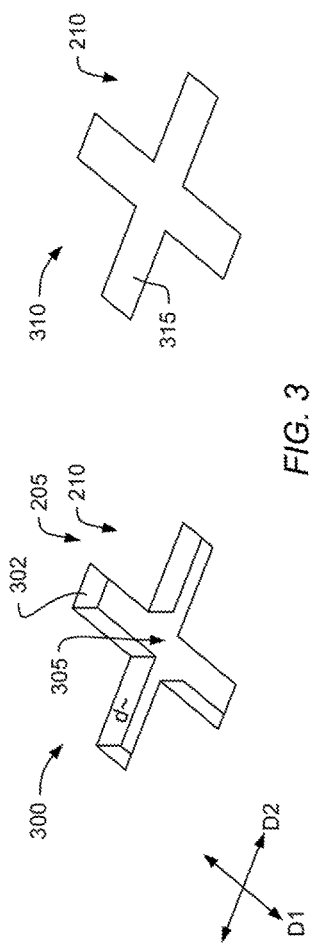
FIG. 3
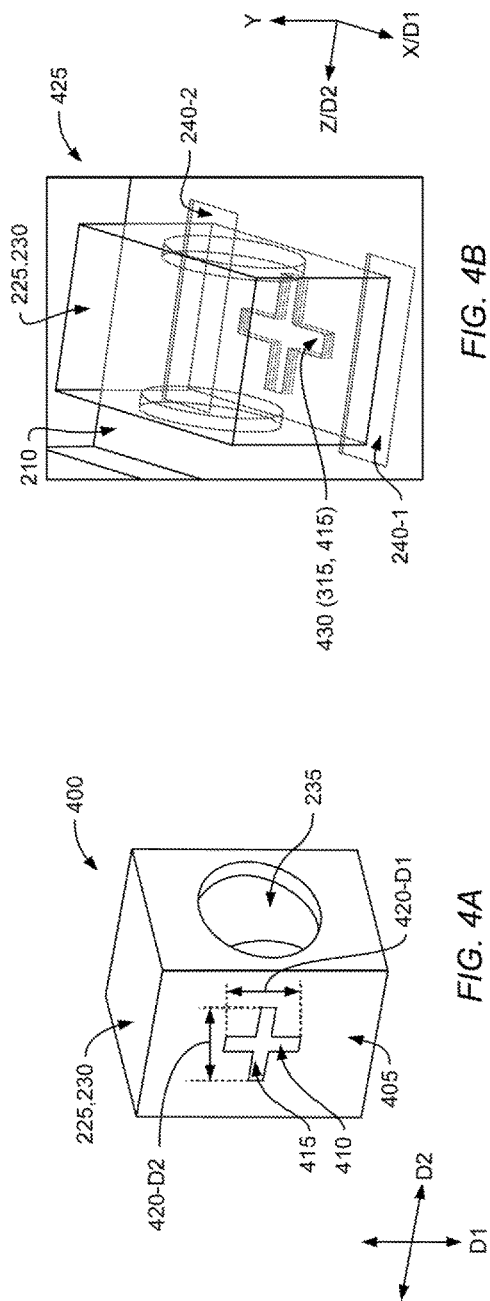
FIG. 4B
FIG. 4A

ALIGNMENT OF OPTICAL COMPONENTS USING NANOMAGNETS

TECHNICAL FIELD

Embodiments presented in this disclosure generally relate to disposing optical components onto a semiconductor substrate. More specifically, the embodiments disclosed herein use deposited magnetic patterns to passively align an optical component with an optical device on the substrate.

BACKGROUND

Alignment of certain optical components with waveguides, such as optical fibers, with a high coupling efficiency continues to be a challenge in the photonics industry. Active alignment of optical components typically requires dedicated equipment using a sub-micron resolution multi-stage axis system with integrated cameras to align the components. Moreover, an active monitoring of coupled light is often required. Not only is this equipment expensive, active alignment slows the fabrication process and limits throughput.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 illustrates an alignment trench having a magnetic pattern deposited therein, according to one embodiment.

FIG. 4A illustrates a magnetic pattern deposited along a surface of an optical component, according to one embodiment.

FIG. 4B illustrates magnetically aligning an optical component with an optical device disposed on a semiconductor substrate, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
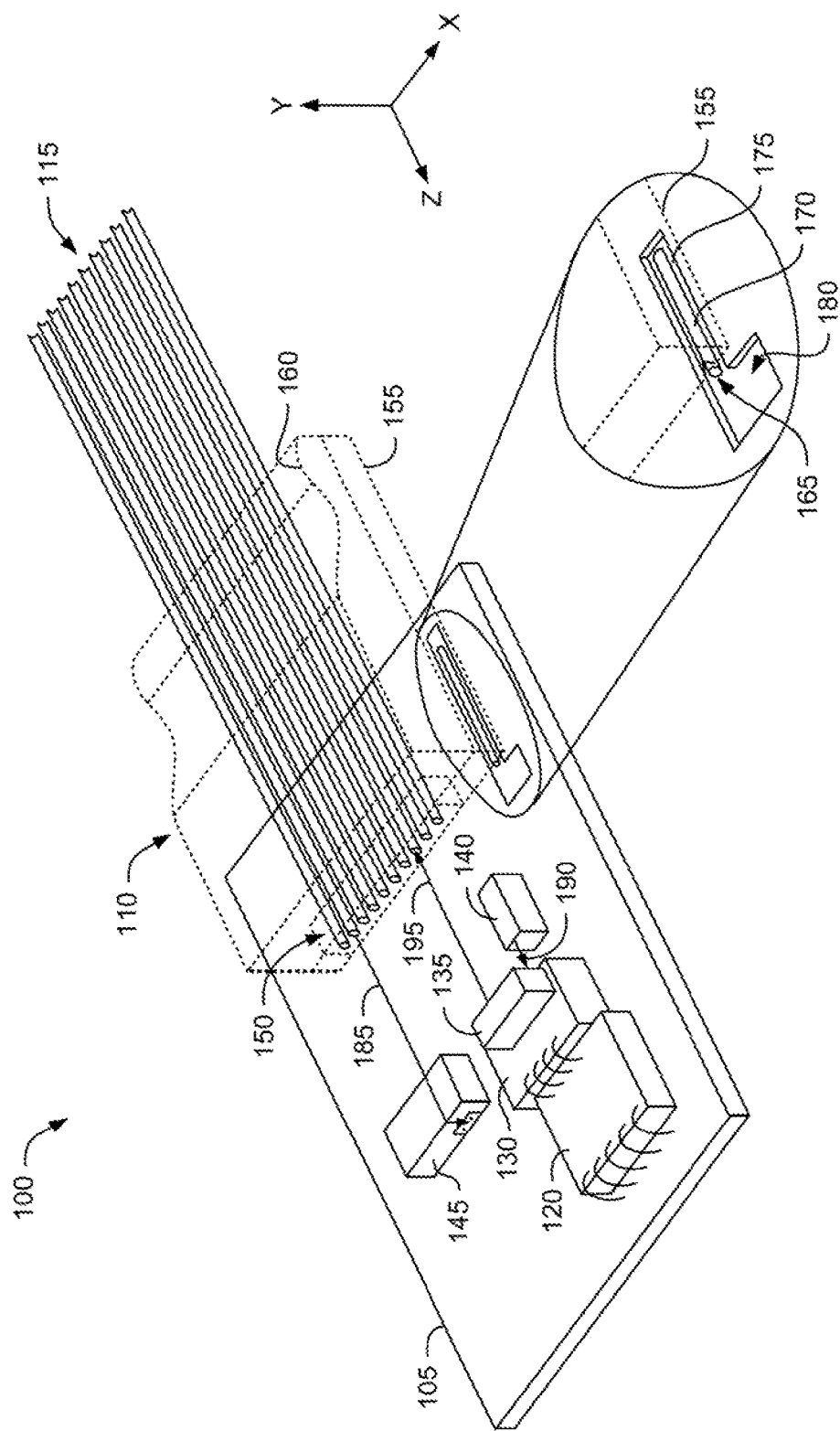
FIG. 1 illustrates an optical system including a fiber array connector coupled with a semiconductor substrate, according to one embodiment.

One embodiment presented in this disclosure is an optical system, comprising a semiconductor substrate having a first magnetic pattern deposited along a first surface of the semiconductor substrate, the first magnetic pattern extending in first and second dimensions along the first surface. The optical system further comprises an optical device coupled with the semiconductor substrate and having a predetermined disposition relative to the first surface, the predetermined disposition including a predetermined orientation with respect to the first and second dimensions. The optical system further comprises an optical component having a second magnetic pattern deposited along a second surface of the optical component, the second magnetic pattern having first and second extents in different dimensions along the second surface. When the first and second magnetic patterns are magnetically coupled, the first and second extents of the second magnetic pattern are respectively aligned in the first and second dimensions, thereby passively aligning the optical component with the optical device.

Another embodiment is a method of passively aligning an optical component with an optical device coupled with a semiconductor substrate. The optical device has a predetermined disposition relative to a first surface of the semiconductor substrate, the optical component has a first magnetic pattern along a second surface of the optical component, and the first magnetic pattern has first and second extents in different dimensions along the second surface. The method comprises depositing, along the first surface of the semiconductor substrate, a second magnetic pattern extending in first and second dimensions, wherein the optical device has a predetermined orientation with respect to the first and second dimensions. The method further comprises magnetically coupling the first and second magnetic patterns such that the first and second extents of the first magnetic pattern are respectively aligned in the first and second dimensions, thereby passively aligning the optical component with the optical device.

Another embodiment is an optical component, comprising a body portion defining a first surface, the first surface having a first magnetic pattern deposited along the first surface, the first magnetic pattern having first and second extents in different dimensions along the first surface. The first magnetic pattern is configured to magnetically couple with a second magnetic pattern deposited along a second surface of a semiconductor substrate, the second magnetic pattern extending in first and second dimensions along the second surface, an optical device coupled with the semiconductor substrate and having a predetermined disposition relative to the second surface, the predetermined disposition including a predetermined orientation with respect to the first and second dimensions. When the first and second magnetic patterns are magnetically coupled, the first and second extents of the first magnetic pattern are respectively aligned in the first and second dimensions, thereby passively aligning the optical component with the optical device.

Example Embodiments

Embodiments herein include an optical system, an optical component, and an associated method of passive alignment in which complementary magnetic patterns are used to provide passive alignment between optical elements. The magnetic coupling between the magnetic patterns operates to align optical elements in at least two dimensions. The magnetic coupling provides a temporary holding force on the optical elements until the optical elements are secured using epoxy or other adhesive.

FIG. 1 illustrates an optical system 100 including a FAC 110 passively aligned on a semiconductor interposer 105, according to one embodiment described herein. In one embodiment, the interposer 105 is made from silicon, but could also be made from any material that permits precision etching to form the trenches described below. The interposer 105 forms a substrate on which various optical components are mounted. In this example, the interposer 105 provides support for the FAC 110, an electrical integrated circuit (IC) 120, a photonic chip 130, a laser module 140, and a receiver 145.

The FAC 110 includes an upper portion 160, a lower portion 155, a collimator array 150, and a plurality of optical fiber cables 115. For clarity, the lower portion 155 and the upper portion 160 of the FAC 110 are transparent in FIG. 1 so that the features inside and below the FAC 110 are visible. One or both of the upper portion 160 and lower portion 155 include grooves (e.g., U-grooves or V-grooves) that extend along the length of the FAC 110 which provide support to the optical fiber cables 115. In one embodiment, the lower portion 155 is made from a semiconductor material (e.g., silicon) and includes the grooves. Many fabrication techniques are known for forming V- or U-shaped grooves in a semiconductor material and these techniques will not be described in detail herein. In another embodiment, the lower portion 155 may be a glass substrate with machines V- or U-shaped grooves. Moreover, in addition to grooves on the underside, the lower portion 155 may also have grooves along its side or top surfaces.

The upper and lower portions 155, 160 are pressed together and attached (e.g., epoxied) to secure the optic cables 115 into place. In one embodiment, the upper portion 160 may be made from glass or other material suitable for mating with the lower portion 155 to hold the fiber optic cables 115 in place. Moreover, the optical cables 115 inside the FAC 110 may have been stripped of the insulative jackets such that these cables 115 only include the core and cladding. Outside of the FAC 110—i.e., the portion of the cables extending away from the interposer 105—the optical cables 115 may still include the jacket.

The optical fibers 115 (and the grooves in the lower portion 155) are aligned to the collimator array 150 which includes multiple lenses that each corresponds to one of the optical cables 115. The collimator array 150 collimates the lights outputted from the optic fibers 115 to generate collimated beams 185 that are received by optical components on the interposer 105. For example, the portion of the optical fibers 115 in the FAC 115 tasked with transmitting optical signals to the interposer 105 are aligned with the receiver 145. The receiver 145 may include a lens array and photodiodes for converting the received optical signals into corresponding electrical signals. In one example, the lens in the receiver 145 reflect the collimated beams 185 received from the FAC 115 down towards photodiodes that are parallel with the upper surface of the interposer 105. As discussed in greater detail below, the interposer 105 may have one or more through vias which transmit the electrical signals derived from the received optical signals to the lower surface of the interposer 105.

To transmit optical signals from the interposer 105 to the FAC 110, the laser module 140 generates a continuous wave (CW) optical signal 190 which strikes a lens array 135 mounted on the photonic chip 130. The lens array 135 focuses the CW signal 190 into a waveguide in the photonic chip 130 (e.g., a silicon photonic chip). The photonic chip 130 may include one or more optical modulators (e.g., Mach-Zehnder interferometers, ring resonators, Fabry-Perot cavities, etc.), sub-micron optical waveguides, CMOS circuitry, and the like. As shown in FIG. 1, the photonic chip 130 includes wire bonds to the electrical IC 120 which permit electrical data signals provided by the IC 120 to control the components in the photonic chip 130. For example, the photonic chip 130 may use the data signal to modulate the CW signal 190 using a modulation technique (e.g., quadrature phase shift keying (QPSK) or quadrature amplitude modulation (QAM)). Once modified, the photonic chip 130 transmits a modulated optical signal via the lens array 135 to the FAC 195. In one embodiment, the lens array 135 collimates the light to form collimated beams 195 which align with respective lens in the collimator array 150 in the FAC 110. The collimator array 150 focuses the collimated beams 195 into respective optical fibers 115. In this example, the interposer 105 and the FAC 110 include optical components for both transmitting optical signals to, and receiving optical signals from, each other.

Aligning the FAC 110 to the optical devices on the interposer 105, presents many challenges. As shown, lenses in the collimator array 150 are aligned with lenses in both the receiver 145 and the lens array 135 for receiving and transmitting optical signals. To permit this transfer of optical signals, the FAC 110 is aligned onto the interposer 105 in the x, y, and z directions. Moreover, any tilt in the FAC 110 along the x, y, or z directions can also misalign the optical paths between the FAC 110 and the receiver 145/lens array 135. For example, if the FAC 110 is tilted in the x-axis such that leftmost portion of the FAC 110 is slightly higher than the rightmost portion, the optical paths transmitting the collimated beams 195 may be aligned while the optical paths transmitting the collimated beams 185 are not.

Although active alignment may be used to align the FAC 110 with the components on the interposer 105, this requires expensive equipment and time to transmit test optical signals, measure the signal power, and adjust the location of the FAC 110 on the interposer 105 until the test signals achieve a desired threshold. Instead, the embodiments herein disclose an alignment structure that passively aligns the FAC 110 and the interposer 105. As used herein, "passively aligning" means that at least two components can be aligned optically in one or more directions without requiring the transmission and detection of optical test signals.

To passively align the FAC 110, the interposer 105 includes a trench 175 and a reservoir 180. The details of these features are provided in the blowout portion of FIG. 1. As shown there, the trench 175 and reservoir 180 are etched into the upper surface of the interposer 105. In one embodiment, a deep reactive ion etch (RIE) is used to generate the trench 175 and reservoir 180. Although FIG. 1 illustrates that these features have the same depth and could be formed during the same etching step, in other embodiments, the trench 175 may have a different depth than the reservoir 180.

A fiber stub 170 is placed into the trench 175 and the V-groove 165 of the lower portion 155 of the FAC 110. In one example, the fiber stub 170 is epoxied to the V-groove 165 before the FAC 110 is placed onto the interposer 105. As explained in more detail below, moving the FAC 110 and the interposer 105 relative to each other until the fiber stub 170 is located within the trench 175 passively aligns the FAC 110. Although only one trench 175 and reservoir 180 are shown in FIG. 1, the interposer 105 may include multiple trenches and reservoirs which align to a corresponding fiber stubs and V-grooves in the FAC 110.

In one embodiment, the features of the reservoir 180 may be used to passively align the FAC 110. For example, the edge of the reservoir 180 closest to the FAC 110 may be used to passively align the FAC 110 in the z-direction. For example, once the fiber stub 170 is deposited within the trench 175, a technician may move the FAC 110 in the z-direction using the trench 175 as a guide until the front side of the FAC 110 that includes the collimator array 150 is parallel with the edge of the reservoir 180 closest to the FAC 110. Stated differently, the trench 170 establishes a guide for sliding the fiber stub 170 (and the entire FAC 110) in the z-direction. Once aligned, epoxy is deposited into the reservoir 180 which uses a capillary action to draw the epoxy into the V-groove 165 thereby attaching the FAC 110 to the interposer 105.

Figure 2:
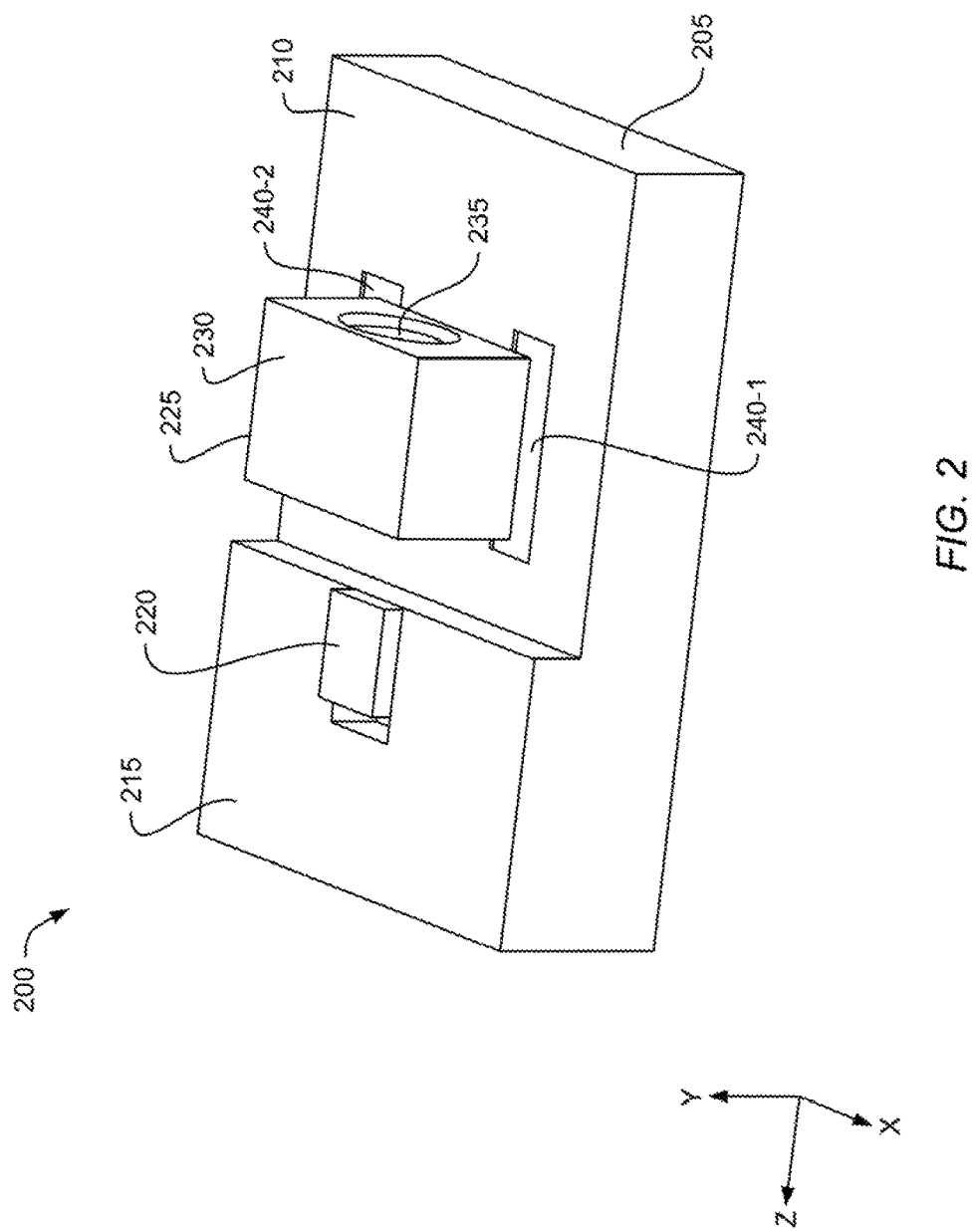
FIG. 2 illustrates an optical system including a lens device coupled with a semiconductor substrate, according to one embodiment.

FIG. 2 illustrates an optical system including a lens device coupled with a semiconductor substrate, according to one embodiment. The optical system 200 generally includes a semiconductor substrate 205 formed of a semiconductor material such as silicon, and having a first surface 210 and a second surface 215. The second surface 215 has an optical device 220 connected therewith. The optical device 220 and second surface 215 may be connected using any suitable means, e.g., applied conductive epoxy or eutectic solders. The optical device 220 and second surface may be connected using similar techniques as those discussed below with respect to first surface 210 and optical component 225. By virtue of its attachment with the second surface 215, the optical device 220 has a predetermined orientation in each of the X, Y, and Z dimensions. As shown, the optical device 220 is a laser diode; however, other optical components are contemplated.

As shown, the second surface 215 has a different height in the Y-dimension than the first surface 210. Although shown as extending in the X-Z plane, in an alternate embodiment the first surface 210 and second surface 215 can extend in different dimensions, which need not be the same dimensions. In an alternate embodiment, the first surface 210 and/or second surface 215 are not substantially planar. In an alternate embodiment, and depending on the geometries of the optical device 220 and the optical component 225 that are being aligned, the first surface 210 and second surface 215 may be a singular surface. In an alternate embodiment, the first surface 210 may be on a first substrate while the second surface 215 is on a second substrate.

An optical component 225 is disposed on the first surface 210. As shown, the optical component 225 is a lens device which, when aligned with the laser diode, provides a collimated light beam; other optical components are contemplated. The optical component 225 includes a housing 230 and a lens 235 formed in a surface of the housing 230. Although not shown, the housing 230 further includes another lens formed in an opposing surface of the housing 230, such that light is transmitted from the laser diode (optical device 220) through the lens device (optical component 225).

In some embodiments, a bottom surface (not shown) of the optical component 225 is configured to slidingly engage with the first surface 210. Generally, engagement of the bottom surface of the optical component 225 with the first surface 210 aligns the optical component 225 with the optical device 220 in the Y-dimension. The Y-dimension alignment is possible with suitably precise etching processes for the substrate 205, such as deep reactive-ion etching (DRIE). Generally, DRIE processes can control dimensions to within about a one (1) micron accuracy.

In an alternate embodiment, the bottom surface of the optical component 225 is not configured to slidingly engage with the first surface for alignment in the Y-dimension. Instead, the optical component 225 may include one or more alignment grooves (e.g., V-groove 165 of FIG. 1) formed in the bottom surface and configured to receive an optical fiber stub (e.g., fiber stub 170), which also corresponds to one or more alignment trenches (e.g., trench 170) formed in the first surface 210 of the semiconductor substrate 205. The fiber stub(s) contacting the alignment grooves and alignment trenches generally provide a predetermined offset between the optical component 225 and first surface 210 in the Y-dimension. As discussed above with respect to FIG. 1, the fiber stub(s) may further control the positioning of the optical component 225 in the X and Z-dimensions.

One or more adhesion trenches 240-1, 240-2 are formed into the first surface 210 and are disposed around the periphery of the optical component 225. While not depicted in FIG. 2, the adhesion trenches 240-1, 240-2 extend underneath the bottom surface of the optical component 225. When the optical component 225 is placed and suitably aligned in the X-Z plane, the adhesion trenches 240-1, 240-2 are filled with an adhesive, such as epoxy, which when cured fastens the aligned optical component 225 with the semiconductor substrate 205 at the interface of the bottom surface and the first surface 210.

When assembling the optical system 200, since the optical device 220 when connected with second surface 215 has a predetermined orientation in at least the X and Z-dimensions, any movement during placement of the optical component 225 may cause misalignment with the optical device 220 in the X and/or Z-dimensions, resulting in reduced optical coupling between the optical device 220 and optical component 225. Further, assembly of the optical system 200 may occur at a panel or wafer-scale level, where a number of adjacent optical systems 200 are assembled prior to separation into individual units through wafer dicing. It is possible to use a single stage of assembly equipment to obtain and transport each optical component 225, and then place each optical component 225 within the corresponding optical system 200 at the panel or wafer-scale level. However, it may be prohibitively expensive to provide a single stage of assembly equipment with a suitably precise alignment (e.g., 1 micron or less) for placing optical components 225 that is also able to provide transport of the optical components over relatively long distances.

In various embodiments described herein, the optical component 225 and first surface 210 may include complementary magnetic patterns that are disposed and arranged such that the optical component 225 has an alignment with the optical device 220 in the X and Z-dimensions when the two magnetic patterns are magnetically coupled. In one embodiment, the alignment provided by the magnetic coupling may be sufficient to optically align (i.e., provide a suitable optical coupling for desired performance of the optical system 200) the optical component 225 with optical device 220. In such cases, epoxy is subsequently applied to the adhesion trenches 240-1, 240-2 to fasten the optical component 225 with the semiconductor substrate 205.

In another embodiment, a first stage of assembly equipment may be used to transport the optical components 225 from a distance away from the wafer and to place each optical component 225 with an initial, "rough" alignment on the wafer. The complementary magnetic patterns temporarily hold the optical components 225 in place in respective locations on the wafer. In this way, the first stage of assembly equipment may provide an initial passive alignment of the optical components 225 with respective optical devices 220 on the wafer, without requiring the enhanced precision for performing an optical alignment. Second assembly equipment, which is generally disposed closer to the wafer than the first assembly equipment, provides a subsequent "precision" alignment of the magnetically-held optical components 225, e.g., in a step-and-repeat operation. During the precision alignment, the second assembly equipment applies at least enough force to the optical component 225 (e.g., gripping opposing sides of the housing 230) to overcome the magnetic coupling. The precision alignment may be an active optical alignment of the optical devices 220 with optical components 225. After each optical component 225 is optically aligned, epoxy or another suitable adhesive is applied to the adhesion trenches 240-1, 240-2 to fasten the optical component 225 with the semiconductor substrate 205. By performing the precision alignment using a second assembly equipment, the first assembly equipment generally requires lower precision and may have a reduced complexity and a corresponding reduced cost.

FIG. 3 illustrates an alignment trench having a magnetic pattern deposited therein, according to one embodiment. View 300 depicts an alignment trench 302 formed into first surface 210 of a semiconductor substrate 205. As shown, the alignment trench 302 is formed to a bottom surface 305 at a depth d from the first surface 210. The alignment trench 302 includes features extending along a first dimension D1 and along a second dimension D2. As shown, dimensions D1 and D2 are orthogonal to each other; other relative orientations of the dimensions D1 and D2 are possible, such as radial.

View 305 depicts a magnetic pattern 315 deposited in the alignment trench 302. Generally the magnetic pattern 315 is formed using a magnetic ink or other suspension of nanomagnetic particles. Some non-limiting examples of nanomagnetic particles include grains of ferromagnetic metals (e.g., iron, cobalt, and nickel) and single-molecule magnets. The nanomagnetic particles generally include one or more transition metals (e.g., titanium, vanadium, chromium, manganese, iron, cobalt, or nickel) and/or rare earth magnetic atoms (e.g., Gadolinium, Europium, and Erbium). The desired amount of magnetic force to be provided by the magnetic coupling (i.e., the magnetic coupling of magnetic pattern 315 with a corresponding magnetic pattern on the optical component) may be generally based on the size and/or weight of the optical components, expected forces on the wafer (e.g., during transport) after placement of the optical components, and so forth. The magnetic force is generally controlled based on the geometry of the magnetic pattern 315, the magnetic properties of the magnetic ink, and so forth. Any suitable magnetic materials may be used that provide sufficient pull force and/or magnetic field strength to move and/or retain the mating optical components together with a desired orientation.

FIG. 4A illustrates a magnetic pattern deposited along a surface of an optical component, according to one embodiment. View 400 depicts a bottom surface 405 of optical component 225. An alignment trench 410 is formed into the bottom surface 405 and a magnetic pattern 415 is deposited into the alignment trench 410. The magnetic pattern 415 has a first extent in the D1 dimension (indicated by 420-D1) and a second extent in the D2 dimension (i.e., 420-D2). Importantly, the extents of the magnetic pattern 415 are configured to align with the features of the magnetic pattern 315 to impart a relative alignment to the optical component 225 along the D1 and D2 dimensions, which is illustrated as magnetic coupling 430 in view 425 (FIG. 4B). In view 425, the D1 dimension of the magnetic patterns 315, 415 generally aligns with the X-dimension of the surface 210, and the D2 dimension generally aligns with the Z-dimension. Thus, the magnetic coupling 430 can provide the optical component 225 with a passive alignment in the X-Z plane. And because the optical device (e.g., optical device 220 of FIG. 2) has a predetermined orientation in the X and Z dimensions, the magnetic coupling 430 can provide a passive alignment of the optical component 225 with the optical device.

The magnetic patterns 315, 415 have been discussed as being deposited into respective alignment trenches formed into respective surfaces, e.g., such that the magnetic patterns 315, 415 are entirely disposed within the volume of the alignment trench (i.e., not extending past the surface). However, in other embodiments one or more magnetic patterns 315, 415 may extend from the alignment trench past the corresponding surface. For example, one or more of magnetic patterns 315, 415 may be deposited directly onto surface without an alignment trench being formed. Such an arrangement may be feasible where the bottom surface of the optical component does not slidingly engage with the surface of the semiconductor substrate for alignment (e.g., instead aligned using fiber stubs in alignment grooves or trenches such as in FIG. 1).

Figure 5:
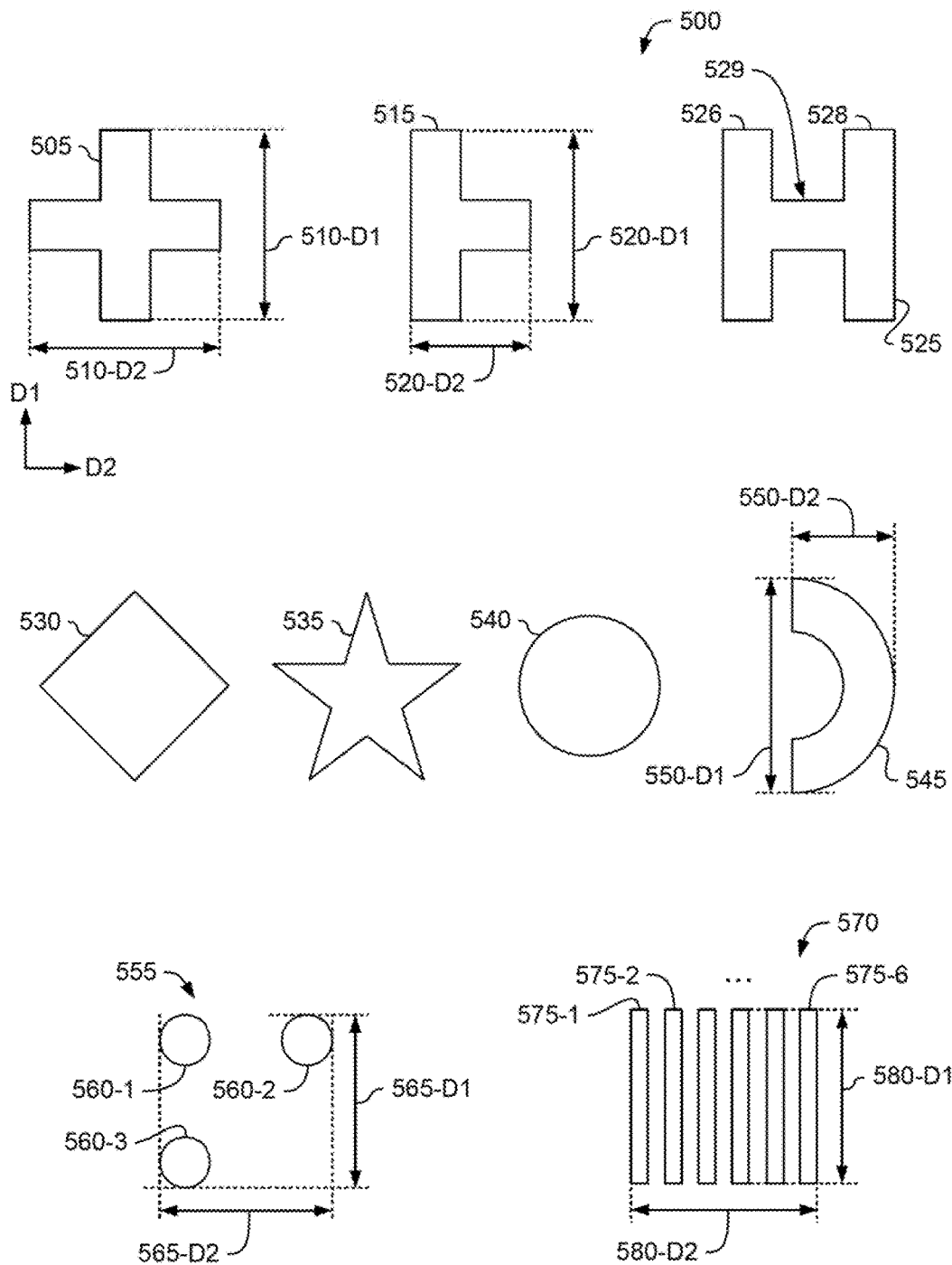
FIG. 5 illustrates exemplary magnetic patterns, according to one embodiment.

FIG. 5 illustrates exemplary magnetic patterns, according to one embodiment. The patterns are provided as non-limiting examples of magnetic patterns 315, 415 of FIGS. 3, 4A, and 4B; many alternate geometries may provide a suitable magnetic coupling of the optical component with the semiconductor substrate. For example, cross-shaped pattern 505 (alternately "plus-shaped," "X-shaped," etc.) is generally depicted in FIGS. 3, 4A, and 4B, but other patterns may be suitable. The cross-shaped pattern 505 extends in first dimension D1 (an extent 510-D1), and extends in second dimension D2 (an extent 510-D2). Dimensions D1 and D2 are shown as orthogonal; however, other relative orientations between the dimensions are possible. As shown, extents 510-D1 and 510-D2 are approximately the same length.

Alternate embodiments of magnetic patterns may have different extents in different dimensions. For example, an optical component with cross-shaped pattern 505 could be misaligned from a corresponding pattern at any of 90, 180, and 270 degree rotations. However, T-shaped pattern 515 provides a smaller extent 520-D2 in the D2 dimension than an extent 520-D1 in the D1 dimension, which can aid a correct alignment of the optical component by distinguishing the different dimensions. As shown, the pattern 515 is asymmetrical in the D2 dimension, although this is not a requirement.

Alternate embodiments of magnetic patterns may include multiple features oriented along a particular dimension, which helps to distinguish the different dimensions. For example, H-shaped pattern 525 includes features 526 and 528 oriented along dimension D1, while feature 529 is oriented along dimension D2.

Alternate embodiments of magnetic patterns may include non-rectangular (e.g., having a length substantially greater than a width) features. Some non-limiting examples include diamond-shaped pattern 530, star-shaped pattern 535, circular pattern 540, and closed arc pattern 545. Each of these patterns has corresponding extents in the D1 and D2 dimensions. For example, even though not all points of star-shaped pattern 535 are aligned with dimensions D1 or D2, the magnetic coupling of corresponding patterns still provides the optical component with alignment in the D1 and D2 dimensions.

Alternate embodiments of magnetic patterns may be formed of a number of shapes in a regular or an irregular pattern. For example, multi-shape pattern 555 includes three circular shapes 560-1, 560-2, 560-3 having an asymmetrical arrangement in the D1 and D2 dimension. Note that multi-shape pattern 555 is symmetrical along an axis bisecting the D1 and D2 dimensions (e.g., along a 45 degree angle). Multi-shape pattern 555 has an extent 565-D1 in dimension D1 and an extent 565-D2 in dimension D2. In another example, multi-shape pattern 570 includes multiple rectangular shapes 575-1 to 575-6, each having an extent 580-D1 in the D1 dimension. Collectively, the rectangular shapes 575-1 to 575-6 have an extent 580-D2 in the D2 dimension.

In some embodiments, the same magnetic patterns are used on each of the optical component and the semiconductor substrate (e.g., FIG. 4B). In other embodiments, different magnetic patterns are used. In alternate embodiments, the magnetic pattern(s) may have an extent in substantially a single dimension (e.g., a rectangle shape having a length substantially greater than a width).

Figure 6:
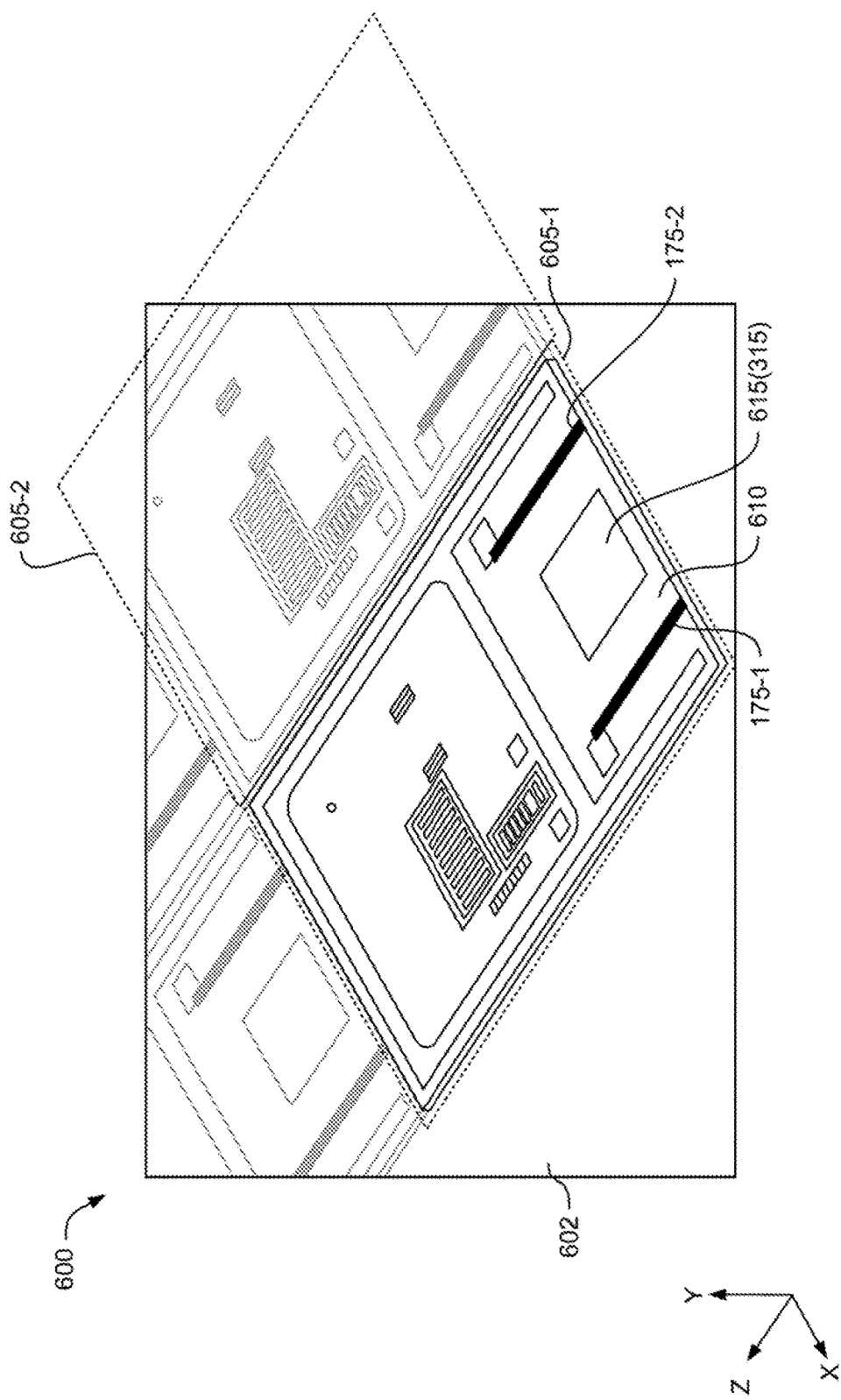
FIG. 6 illustrates a wafer-level arrangement of optical systems, according to one embodiment.
Figure 7:
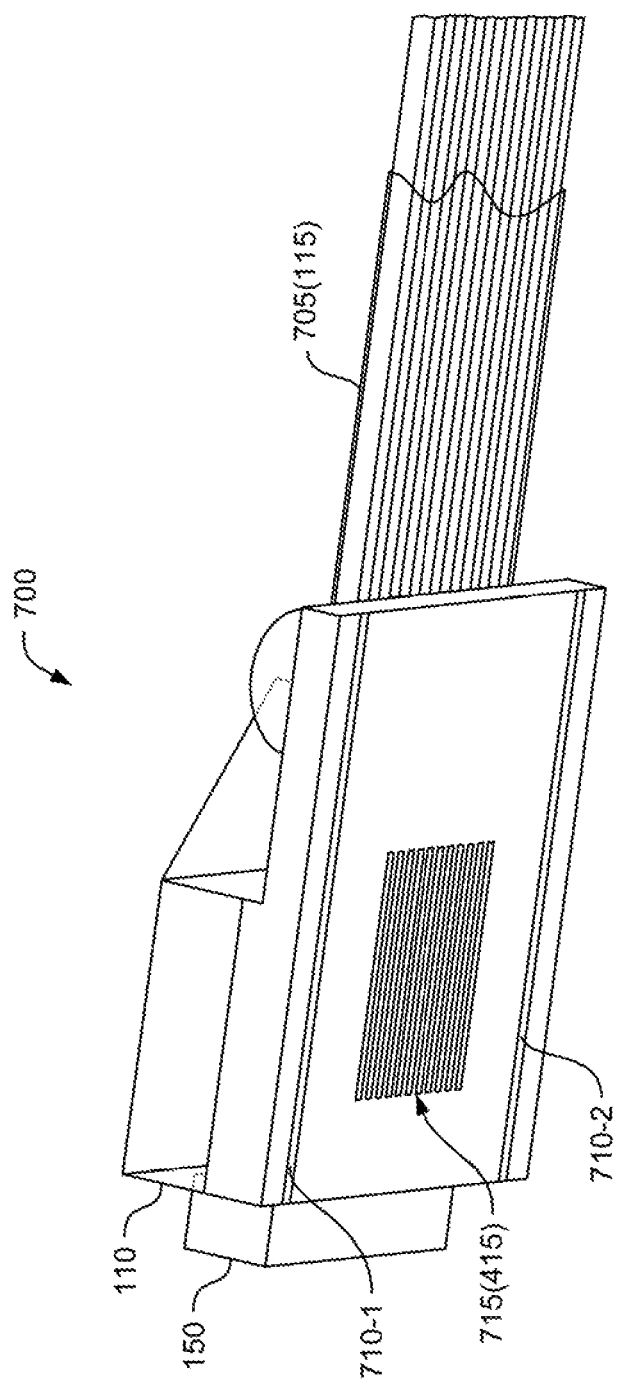
FIG. 7 illustrates a fiber array connector having a magnetic pattern deposited along a surface thereof, according to one embodiment.

FIG. 6 illustrates a wafer-level arrangement of optical systems, according to one embodiment. FIG. 7 illustrates a fiber array connector (FAC) having a magnetic pattern deposited along a surface thereof, according to one embodiment. The FAC 110 in arrangement 700 of FIG. 7 is generally configured to align with the optical systems 605-1, 605-2 shown in the wafer-level arrangement 600 of FIG. 6.

Semiconductor wafer 602 includes a plurality of adjacent optical systems 605-1, 605-2. The optical system 605-1 includes a surface 610, into which alignment trenches 175-1, 175-2 are formed for fiber stub alignment. Inserted fiber stubs also contact alignment grooves 710-1, 710-2 formed into the bottom surface of the FAC 110.

Another alignment trench 615 may be formed in the surface 610 with a magnetic pattern 315 deposited therein. Consistent with the discussion above, magnetic pattern 315 may alternately be deposited onto the surface 610. While fiber stubs inserted in the alignment trenches 175-1, 175-2 provides alignment of the FAC 110 in the X-Z plane, typically due to tension on fiber ribbon cable 705 some force should be applied to the FAC 110 in the negative-Y direction to temporarily hold the FAC 110 in place with the optical system 605-1 until securing using more permanent means, e.g., using an epoxy. In some embodiments, instead of using assembly machinery to provide the force for the temporary hold, the FAC 110 includes a feature 715 corresponding to a magnetic pattern 415. The feature 715 may be formed into the bottom surface of the FAC 110, or may extend from the bottom surface. For example, and as shown, the feature 715 comprises a plurality of parallel alignment grooves each configured to receive magnetic ink to form the magnetic pattern 415. The magnetic pattern 415 along with the inserted fiber stubs provides alignment of the FAC 110 with an optical devices on the surface 610. The magnetic pattern 415 provides a temporary hold of the FAC 110 to the surface 610 before securing the portions using epoxy (e.g., applied to secure the fiber stubs within the alignment trenches 175-1, 175-2 and the alignment grooves 710-1, 710-2. Although not shown, separate adhesion trenches may be formed in the surface 610 for attaching the FAC 110.

Figure 8:
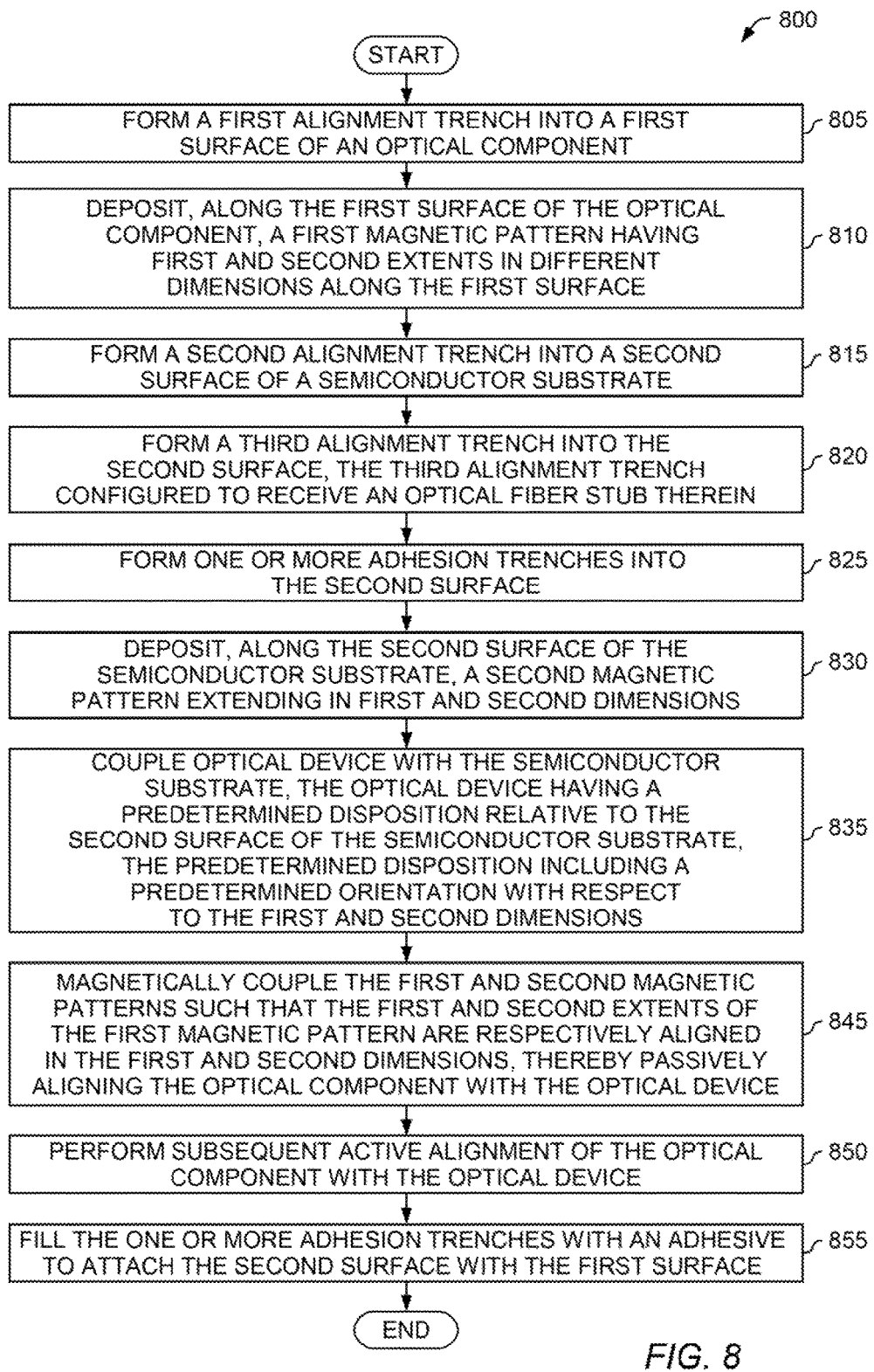
FIG. 8 illustrates a method of passively aligning an optical component with an optical device coupled with a semiconductor substrate, according to one embodiment.

FIG. 8 illustrates a method of passively aligning an optical component with an optical device coupled with a semiconductor substrate, according to one embodiment. Method 800 is generally intended to be used in conjunction with any of the embodiments discussed above. Method 800 may alternately include greater or fewer blocks, and/or the blocks may be performed in a different order.

Method 800 begins at block 805, where a first alignment trench is formed into a first surface of an optical component. In one embodiment, the optical component includes a housing formed of a substrate material (such as silicon), and forming the first alignment trench is performed using deep reactive-ion etching (DRIE) of the housing.

At block 810, a first magnetic pattern is deposited along the first surface of the optical component. In some embodiments, the first magnetic pattern is deposited into the first alignment trench. The first magnetic pattern is formed using a magnetic ink or other suspension of nanomagnetic particles, and has first and second extents in different dimensions along the first surface. In some cases, depositing the first magnetic pattern can be done using epoxy tools. In an alternate embodiment, the first magnetic pattern is deposited on the first surface.

At block 815, a second alignment trench is formed into a second surface of a semiconductor substrate. In one embodiment, the second alignment trench is formed using DRIE. The semiconductor substrate may be the same material as the optical component, e.g., silicon. In some embodiments, the second surface of the semiconductor substrate is configured to slidingly engage the first surface of the optical component to align the optical component in at least a first dimension.

At block 820, a third alignment trench is formed into the second surface of the semiconductor substrate. The third alignment trench is configured to receive an optical fiber stub therein. The first surface of the optical component may further include an alignment groove formed therein and configured to receive the optical fiber stub. The contact of the optical fiber stub with the alignment trench and the alignment groove aligns the optical component in at least second and third dimensions.

At block 825, one or more adhesion trenches are formed into the second surface of the semiconductor substrate. The adhesion trenches may be disposed near the periphery of the optical component and extending beneath the first surface of the optical component.

At block 830, a second magnetic pattern is deposited along the second surface of the semiconductor substrate. The second magnetic pattern extends in first and second dimensions.

At block 835, an optical device is coupled with the semiconductor substrate. The optical device has a predetermined disposition relative to the second surface of the semiconductor substrate. The predetermined disposition includes a predetermined orientation with respect to the first and second dimensions.

At block 845, the first and second magnetic patterns are magnetically coupled such that the first and second extents of the first magnetic pattern are respectively aligned in the first and second dimensions. The alignment provides a passive alignment of the optical component with the optical device.

At block 850, a subsequent active alignment is performed of the optical component with the optical device. In some embodiments, this may be performed by separate assembly machinery than the assembly machinery used to magnetically couple the first and second magnetic patterns.

At block 855, the one or more adhesion trenches are filled with an adhesive to attach the second surface with the first surface. Alternately, in embodiments using fiber stubs, the first and second surfaces do not directly engage, but the adhesive secures the fiber stubs within the alignment trench and alignment groove to fix the relative orientation of the first and second surfaces. Method 800 generally ends following completion of block 855.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The flowchart and block diagrams in the Figures illustrate the architecture, functionality and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. An optical system, comprising:
    a semiconductor substrate having a first magnetic pattern deposited along a first surface of the semiconductor substrate, the first magnetic pattern extending in first and second dimensions along the first surface;
    an optical device coupled with the semiconductor substrate and having a predetermined disposition relative to the first surface, the predetermined disposition including a predetermined orientation with respect to the first and second dimensions; and
    an optical component having a second magnetic pattern deposited along a second surface of the optical component, the second magnetic pattern having first and second extents in different dimensions along the second surface, wherein the first and second magnetic patterns are formed using a fluid containing magnetic nanoparticles; and
    wherein, when the first and second magnetic patterns are magnetically coupled, the first and second extents of the second magnetic pattern are respectively aligned in the first and second dimensions, thereby passively aligning the optical component with the optical device.

2. The optical system of claim 1, wherein the first magnetic pattern is deposited in a first alignment trench formed into the first surface.

3. The optical system of claim 2, wherein the second magnetic pattern is deposited into one of:
    a second alignment trench formed into the second surface, and
    a plurality of alignment grooves formed into the second surface.

4. The optical system of claim 1, wherein the semiconductor substrate defines at least a first alignment trench formed into the first surface and configured to receive an optical fiber stub therein, wherein the optical component defines at least one alignment groove formed into the second surface and configured to receive the optical fiber stub.

5. The optical system of claim 4, wherein the optical fiber stub includes a core and a cladding of an optical fiber cable without including a jacket of the optical fiber cable.

6. The optical system of claim 1, wherein the semiconductor substrate defines one or more adhesion trenches formed into the first surface, which when filled with an adhesive are configured to attach the second surface to the first surface.

7. The optical system of claim 1, wherein the first and second magnetic patterns are respectively deposited onto the first and second surfaces.

8. The optical system of claim 1, wherein the semiconductor substrate is an interposer having a plurality of vias extending therethrough for electrically connecting the first surface with an opposite third surface of the interposer, and wherein the optical component is a fiber array connector.

9. A method of passively aligning an optical component with an optical device coupled with a semiconductor substrate, the optical device having a predetermined disposition relative to a first surface of the semiconductor substrate, the optical component having a first magnetic pattern along a second surface of the optical component, the first magnetic pattern having first and second extents in different dimensions along the second surface, the method comprising:
    depositing, along the first surface of the semiconductor substrate, a second magnetic pattern extending in first and second dimensions, wherein the optical device has a predetermined orientation with respect to the first and second dimensions, and wherein the first and second magnetic patterns are formed using a fluid containing magnetic nanoparticles;
    magnetically coupling the first and second magnetic patterns such that the first and second extents of the first magnetic pattern are respectively aligned in the first and second dimensions, thereby passively aligning the optical component with the optical device.

10. The method of claim 9, further comprising:
    forming at least a first alignment trench into the first surface,
    wherein the second magnetic pattern is deposited into the at least one alignment trench.

11. The method of claim 10, wherein forming the at least one alignment trench is performed using a deep reactive-ion etching process.

12. The method of claim 10, further comprising:
    forming at least a second alignment trench into the first surface,
    wherein the second alignment trench is configured to receive an optical fiber stub therein, wherein the optical component defines at least one alignment groove formed into the second surface and configured to receive the optical fiber stub.

13. The method of claim 12, wherein the optical fiber stub includes a core and a cladding of an optical fiber cable without including a jacket of the optical fiber cable.

14. The method of claim 9, further comprising:
forming one or more adhesion trenches into the first surface; and
filling, after magnetically coupling the first and second magnetic patterns, the one or more adhesion trenches with an adhesive to attach the second surface to the first surface.

15. An optical component, comprising:
a body portion defining a first surface, the first surface having a first magnetic pattern deposited along the first surface, the first magnetic pattern having first and second extents in different dimensions along the first surface,
wherein the first magnetic pattern is configured to magnetically couple with a second magnetic pattern deposited along a second surface of a semiconductor substrate, the second magnetic pattern extending in first and second dimensions along the second surface, an optical device coupled with the semiconductor substrate and having a predetermined disposition relative to the second surface, the predetermined disposition including a predetermined orientation with respect to the first and second dimensions, and wherein the first and second magnetic patterns are formed using a fluid containing magnetic nanoparticles;
wherein, when the first and second magnetic patterns are magnetically coupled, the first and second extents of the first magnetic pattern are respectively aligned in the first and second dimensions, thereby passively aligning the optical component with the optical device.

16. The optical component of claim 15, wherein the first magnetic pattern is deposited in a first alignment trench formed into the first surface.

17. The optical component of claim 15, wherein the semiconductor substrate defines at least a first alignment trench formed into the second surface and configured to receive an optical fiber stub therein, wherein the body portion further defines at least one alignment groove formed into the first surface and configured to receive the optical fiber stub.

18. The optical component of claim 17, wherein the optical fiber stub includes a core and a cladding of an optical fiber cable without including a jacket of the optical fiber cable.

* * * * *